US008960785B2

United States Patent
Kuno (10) Patent No.: US 8,960,785 B2
(45) Date of Patent: Feb. 24, 2015

(54) VEHICLE SEAT

(71) Applicant: Toyota Boshoku Kabushiki Kaisha, Aichi-ken (JP)

(72) Inventor: Satoru Kuno, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/901,955

(22) Filed: May 24, 2013

(65) Prior Publication Data

US 2013/0313867 A1 Nov. 28, 2013

(30) Foreign Application Priority Data

May 28, 2012 (JP) ................................. 2012-120545

(51) Int. Cl.
*A47C 1/02* (2006.01)
*A61G 15/00* (2006.01)
*B60N 2/02* (2006.01)
*B60N 2/62* (2006.01)
*B64D 11/06* (2006.01)

(52) U.S. Cl.
CPC .. *B60N 2/02* (2013.01); *B60N 2/62* (2013.01); *B64D 11/06* (2013.01); *B64D 2011/0606* (2013.01); *B64D 2011/0648* (2013.01)
USPC .......... 297/68; 297/311; 297/284.11; 297/84; 297/423.1

(58) Field of Classification Search
USPC .................. 297/68, 83, 423.3, 423.36, 423.1, 297/284.11, 84, 311
See application file for complete search history.

(56) References Cited

U.S. PATENT DOCUMENTS

| 4,805,960 | A * | 2/1989 | Tacker ........................ 297/85 L |
| 6,095,610 | A * | 8/2000 | Okajima et al. ......... 297/423.36 |
| 7,273,257 | B2 * | 9/2007 | De Vroe ................... 297/452.26 |
| 7,523,888 | B2 * | 4/2009 | Ferry et al. ................. 244/118.6 |
| 7,614,693 | B2 * | 11/2009 | Ito ............................ 297/284.11 |
| 8,016,355 | B2 * | 9/2011 | Ito et al. ........................ 297/337 |
| 8,567,868 | B2 * | 10/2013 | Kuno ......................... 297/423.3 |
| 8,602,499 | B2 * | 12/2013 | Driessen et al. ......... 297/423.36 |
| 2007/0090673 | A1* | 4/2007 | Ito ................................. 297/330 |
| 2012/0235449 | A1* | 9/2012 | Wiecek ........................... 297/84 |
| 2013/0285433 | A1* | 10/2013 | Yamada et al. ............ 297/423.3 |

FOREIGN PATENT DOCUMENTS

JP 3-45748 4/1991
JP 2011-225042 11/2001

* cited by examiner

*Primary Examiner* — Chi Q Nguyen
(74) *Attorney, Agent, or Firm* — Greenblum & Bernstein, P.L.C.

(57) ABSTRACT

A vehicle seat includes a seat cushion movable in a front-rear direction, an ottoman provided at a front portion of the seat cushion such that the ottoman can be stored and unfolded to function as a footrest, and a transmitting mechanism which moves the ottoman from a stored position to an unfolded position in association with change of a position of the seat cushion in the front-rear direction from a rear side position which is a normal use position to a front side position which is a comfortable position, and which moves the ottoman from the unfolded position to the stored position in association with return of the position of the seat cushion in the front-rear direction from the comfortable position to the normal use position.

5 Claims, 7 Drawing Sheets

VEHICLE SEAT

BACKGROUND OF THE INVENTION

1. Field of the Invention

The present invention relates to a vehicle seat including an ottoman provided at a front portion of a seat cushion such that the ottoman can be stored and unfolded to function as a footrest.

2. Description of the Related Art

There has been known a vehicle seat which has an ottoman provided at a front portion of a seat cushion and functioning as a footrest, and has a configuration in which the ottoman is stored and unfolded by a rotational motion using a plurality of links (JP-UM-Hei. 3-45748).

Figure 7A:
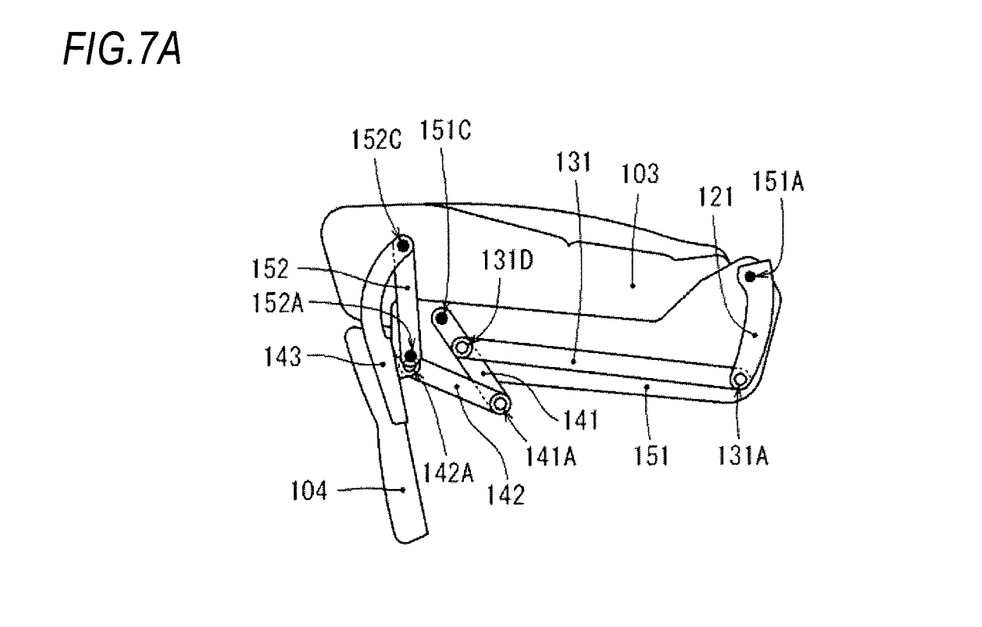
FIGS. 7A and 7B are views illustrating the stored position and unfolded position of an ottoman 104 in a related-art vehicle seat, respectively.
Figure 7B:
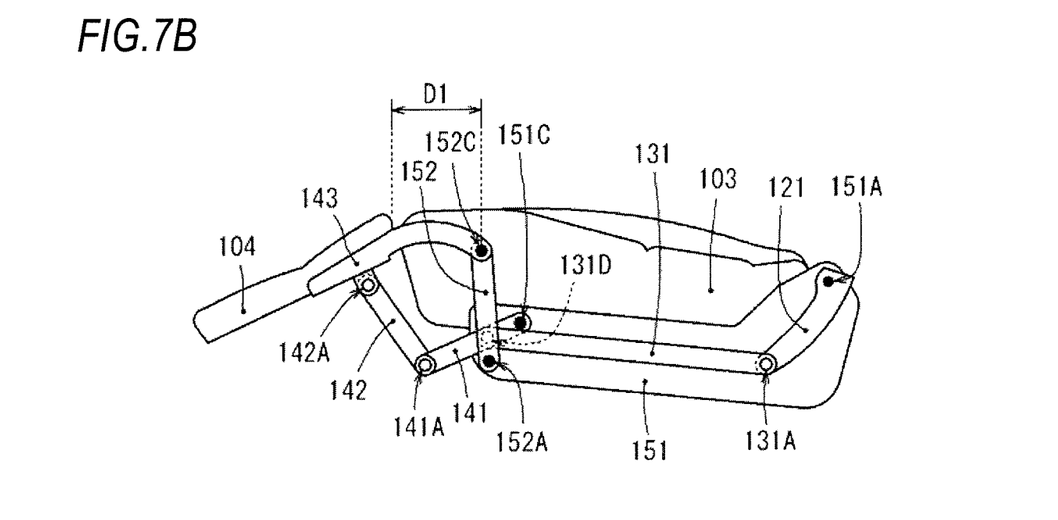

In the technique described in JP-UM-Hei. 3-45748, as shown in FIGS. 7A and 7B, an ottoman 104 is connected to a seat back frame 121 through a link mechanism, and the ottoman 104 is configured to be pushed up to an unfolded position in association with a motion to recline a seat back backward (a motion to move the rear side of the seat back frame 121 forward).

As shown in FIGS. 7A and 7B, on a base frame 151 which is a fixed structure, support portions 151A and 151C are provided.

The seat back frame 121 is supported to be rotatable around the support portion 151A. Therefore, when the seat back is tilted from a normal use position shown in FIG. 7A to a comfortable position shown in FIG. 7B, the seat back frame 121 rotates around the support portion 151A, thereby moving a slide frame 131 supported by a support portion 131A forward.

One end of the slide frame 131 is supported on the seat back frame 121 through the support portion 131A, and the other end thereof is supported on a first link member 141 through a support portion 131D.

One end of the first link member 141 is supported on the base frame 151 through the support portion 151C, and the other end thereof supports one end of a second link member 142 through a support portion 141A, and at an intermediate position between both ends of the first link member 141, the support portion 131D is provided to support the slide frame 131.

One end of the second link member 142 is supported on the other end of the first link member 141 through the support portion 141A, and the other end thereof supports an ottoman frame 143 through a support portion 142A.

As for the ottoman frame 143, one end of the ottoman frame 143 is supported by a support portion 152C of a fixed arm 152 fixed to the base frame 151, and an intermediate position of the ottoman frame 143 is supported on the other end of the second link member 142 through the support portion 142A.

SUMMARY OF THE INVENTION

In order to provide a more comfortable position to a sitting person, it is considered preferable not only to recline a seat back such that an ottoman is pulled up but also to increase a tilt of a seating face of a seat cushion as compared to that during normal sitting.

Meanwhile, for a rear seat of a sedan vehicle, since a structural member of the vehicle is installed on a rear side of the seat back, in order to provide a comfortable position while keeping a space for a sitting person during normal sitting, it is generally employed the configuration where a seat back reclines while sliding a seat cushion forward.

In this case, it is necessary to move the seat cushion forward to unfold an ottoman.

In the technique described in JP-UM-Hei. 3-45748, according to a tilt angle of the seat back, the ottoman 104 is moved to an unfolded position. However, the position of a seat cushion 103 in the front-rear direction is fixed such that the seat cushion does not move in the front-rear direction. In a case of applying the mechanism described in JP-UM-Hei. 3-45748 to a vehicle seat having a seat cushion which can be moved without tilting a seat back, when the seat back is tilted, it is possible to unfold an ottoman. However, if the seat cushion is moved forward without tilting the seat back, it is impossible to unfold the ottoman.

In unfolding the ottoman by forward movement of the seat cushion, in an actuating mechanism of JP-UM-Hei. 3-45748 shown in FIGS. 7A and 7B, it is necessary to configure the seat cushion 103 to be movable in the front-rear direction, and change a connection position of the support portion 131A of one end of the slide frame 131 from the seat back frame 121 to the seat cushion 103. However, in the case of changing the connection position of the support portion 131A to the seat cushion 103, even if the seat cushion 103 moves forward, the position where the ottoman 104 can be unfolded does not move forward. Therefore, the unfolded ottoman 104 and the seat cushion 103 having moved forward interfere with each other.

The present invention has been made in view of the above circumstances, and an object of the present invention is to provide a vehicle seat capable of unfolding an ottoman by forward movement of a seat cushion and capable of preventing interference between the unfolded ottoman and the seat cushion having moved forward.

According to an illustrative embodiment of the present invention, there is provided a vehicle seat comprising: a seat cushion movable in a front-rear direction; an ottoman provided at a front portion of the seat cushion such that the ottoman can be stored and unfolded to function as a footrest; and a transmitting mechanism which moves the ottoman from a stored position to an unfolded position in association with change of a position of the seat cushion in the front-rear direction from a rear side position which is a normal use position to a front side position which is a comfortable position, and which moves the ottoman from the unfolded position to the stored position in association with return of the position of the seat cushion in the front-rear direction from the comfortable position to the normal use position. The transmitting mechanism includes: a base frame; a moving frame; a first link member; and a second link member. The base frame is provided in the front-rear direction of the seat cushion, the moving frame is provided to move with respect to the base frame in association with an amount of movement of the seat cushion in the front-rear direction, and gradually move forward as an amount of forward movement of the seat cushion increases, one end portion of the first link member is rotatably supported with respect to the base frame, the other end portion of the first link member is rotatably supported with respect to one end portion of the second link member, and an arbitrary portion between the one end portion and the other end portion of the first link member is rotatably supported with respect to the moving frame, the one end portion of the second link member is rotatably supported with respect to the other end portion of the first link member, and the other end portion of the second link member is rotatably supported with respect to the ottoman, and the ottoman is hung on a front end of the moving frame such that the ottoman is rotatable with respect to the moving frame.

According to this configuration, the ottoman is hung on the front end of the moving frame which moves forward when the position of the seat cushion in the front-rear direction is changed from the normal use position to the comfortable position.

Therefore, with the simple configuration, it is possible to unfold the ottoman by forward movement of the seat cushion. Also, since the ottoman is hung on the front end of the moving frame which moves forward in association with forward movement of the seat cushion, it is possible to unfold the ottoman while moving the ottoman forward, and to appropriately prevent interference between the unfolded ottoman and the seat cushion having moved forward.

In the above vehicle seat, the portion of the first link member rotatably supported with respect to the moving frame may be supported through a long hole formed in a longitudinal direction of the first link member.

According to this configuration, the first link member is supported on the moving frame through the long hole formed in the first link member.

The long hole can guide the position of a support portion which is supported on the moving frame which moves forward, to a more appropriate position.

Therefore, with the simple configuration, it is possible to expand the movable range of the first link member, and to unfold the ottoman more horizontally.

In the above vehicle seat, the one end portion of the first link member rotatably supported with respect to the base frame may be supported through a long hole formed in the longitudinal direction of the first link member.

According to this configuration, the first link member is supported on the base frame through the long hole formed in the first link member.

The long hole makes it possible to slide the first link member supported on the moving frame, which moves forward, forward while maintaining a state where the first link member is supported on the base frame.

Therefore, with the simple configuration, it is possible to expand the movable range of the first link member, and to unfold the ottoman more horizontally.

DETAILED DESCRIPTION

Hereinafter, illustrative embodiments of the present invention will be described with reference to the accompanying drawings.

[Configuration of Vehicle Seat 1 (FIG. 1)]

Figure 1:
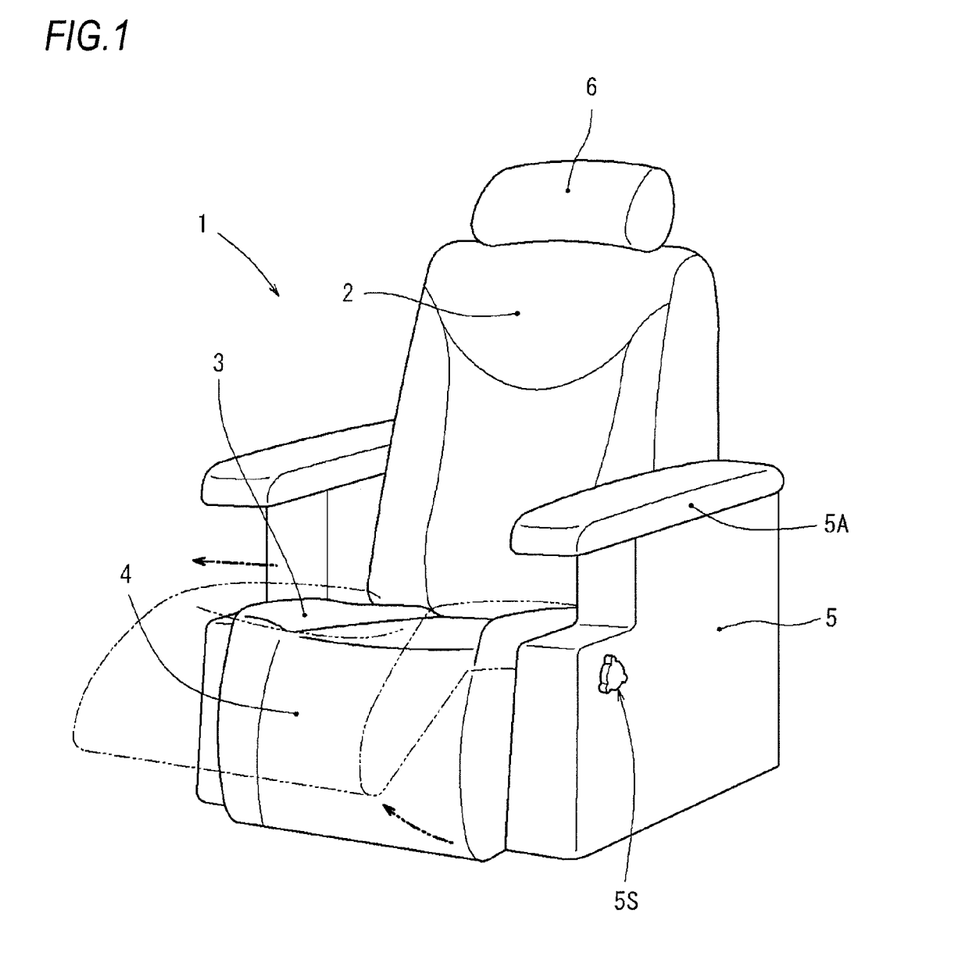
FIG. 1 is a view illustrating an exemplary appearance (a solid line) of a vehicle seat 1 in which a position of a seat cushion 3 in a front-rear direction is a normal use position and an ottoman 4 is at a stored position, and an exemplary appearance (an alternate long and short dash line) of the vehicle seat 1 in which the seat cushion 3 has moved forward in the front-rear direction such that the seat cushion 3 is in a comfortable position, and the ottoman 4 is at an unfolded position.

A vehicle seat 1 is a so-called captain seat for one person and includes a seat cushion 3 on which a sitting person sits down, a seat back 2 against which the sitting person leans back, a headrest 6 against which the sitting person leans his head, and an ottoman 4 which functions as a footrest for the sitting person. The vehicle seat 1 is provided in the second row or third row of a vehicle.

At the left and right side portions of the vehicle seat 1, seat bases 5 are provided to stand in a standing wall shape from a floor of the vehicle, and the vehicle seat 1 is connected to and supported on the seat bases 5. Also, on the top surfaces of the seat bases 5, armrests 5A are provided, respectively. Further, the seat cushion 3 is configured to be slidable in a front-rear direction.

Also, in FIG. 1, an appearance shown by a solid line shows a state where the position of the seat cushion 3 in the front-rear direction is a rear side position which is a normal use position, and an appearance shown by an alternate long and short dash line shows a state where the position of the seat cushion 3 in the front-rear direction has been moved to a front side position which is a comfortable position.

The comfortable position may refer to any front positions within a range from the normal use position at the rear side to a foremost position.

Also, a canceling mechanism 5S for cancelling an operation to automatically unfold the ottoman 4 in association with forward movement of the seat cushion 3 will be omitted.

When changing the position of the seat cushion 3 in the front-rear direction to the normal use position, the ottoman 4 is automatically folded to a stored position shown by the solid line in FIG. 1, and when moving the position of the seat cushion 3 in the front-rear direction toward the front side such that the seat cushion 3 becomes the comfortable position, the ottoman 4 automatically moves to the unfolded position shown by the alternate long and short dash line in FIG. 1.

The vehicle seat 1 according to the illustrative embodiment has a transmitting mechanism which automatically moves the ottoman 4 from the stored position to the unfolded position when moving the position of the seat cushion 3 in the front-rear direction from the normal use position toward the front side such that the seat cushion becomes the comfortable position. Hereinafter, detailed structures of the transmitting mechanism according to first and second illustrative embodiments will be described sequentially.

In the first and second illustrative embodiments shown in FIGS. 2 to 6, a structure in which a tilt angle of a seat back frame 21 of the seat back 2 changes in association with movement of a slide frame 31 (the seat cushion 3) in the front-rear direction will be described as an example. However, it is also possible to independently move the slide frame 31 of the seat cushion 3 in the front-rear direction, without associating the tilt angle of the seat back 2 with movement of the seat cushion 3 in the front-rear direction.

Herein, the stored position indicates a position where the ottoman 4 is hung on a front end of the seat cushion 3 such that a front end of the ottoman 4 is directed downward as shown by the solid line in FIG. 1.

Also, the unfolded position indicates a position where the front end of the ottoman 4 has been moved upward from the stored position as shown by the alternate long and short dash line in FIG. 1, and includes any positions within a range beyond the stored position to the uppermost position.

[Transmitting Mechanism of First Illustrative Embodiment (FIGS. 2 to 4)]

The detailed structure of the transmitting mechanism of the first illustrative embodiment will be described with reference to FIGS. 2 to 4.

The transmitting mechanism of the first illustrative embodiment and the transmitting mechanism of the second illustrative embodiment are different in the positions of long holes of first link members.

Figure 2:
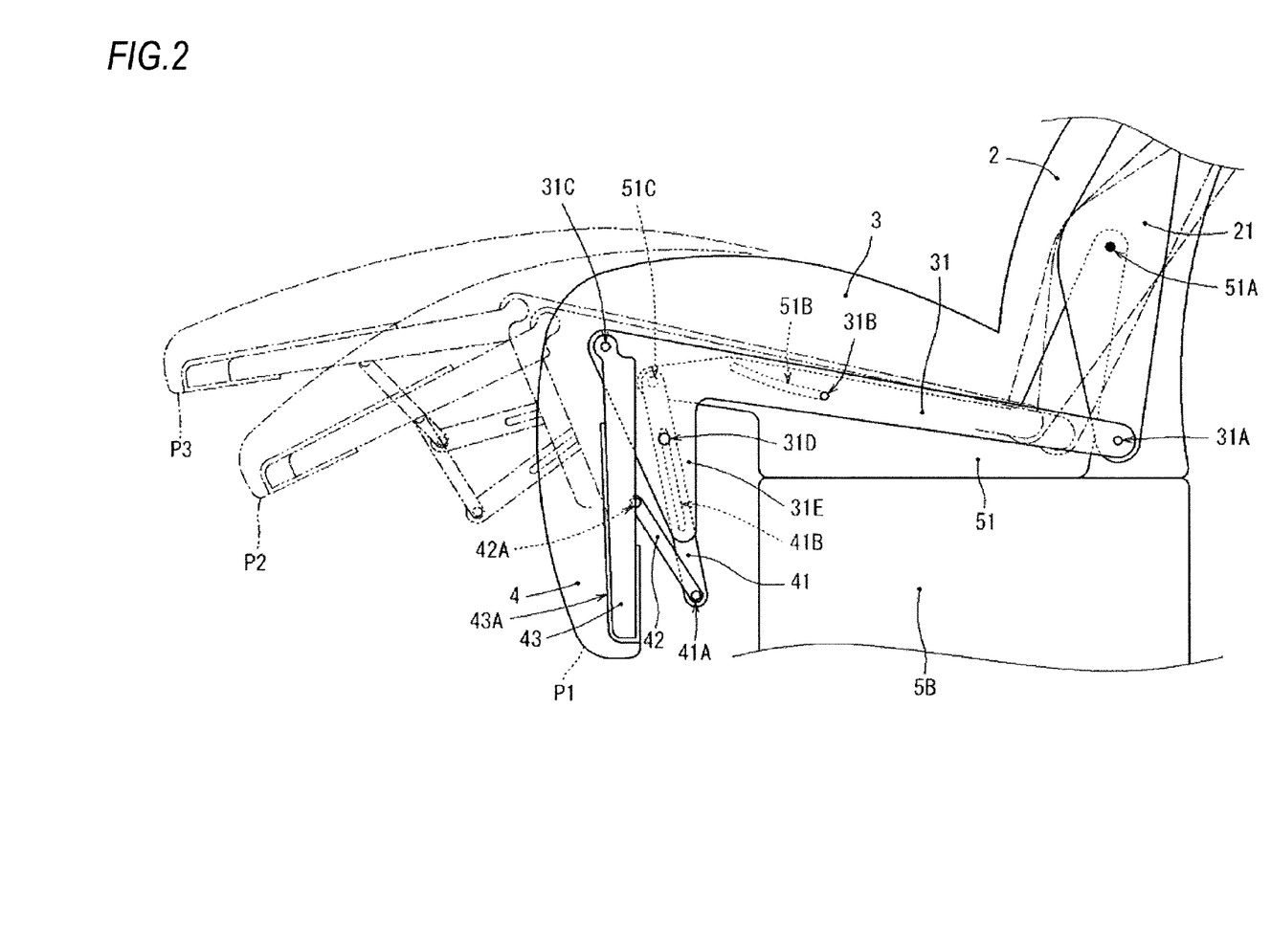
FIG. 2 is a view illustrating a transmitting mechanism in a state where the position of the seat cushion 3 in the front-rear direction is the normal use position and the ottoman 4 is at the stored position in a first illustrative embodiment.
Figure 3:
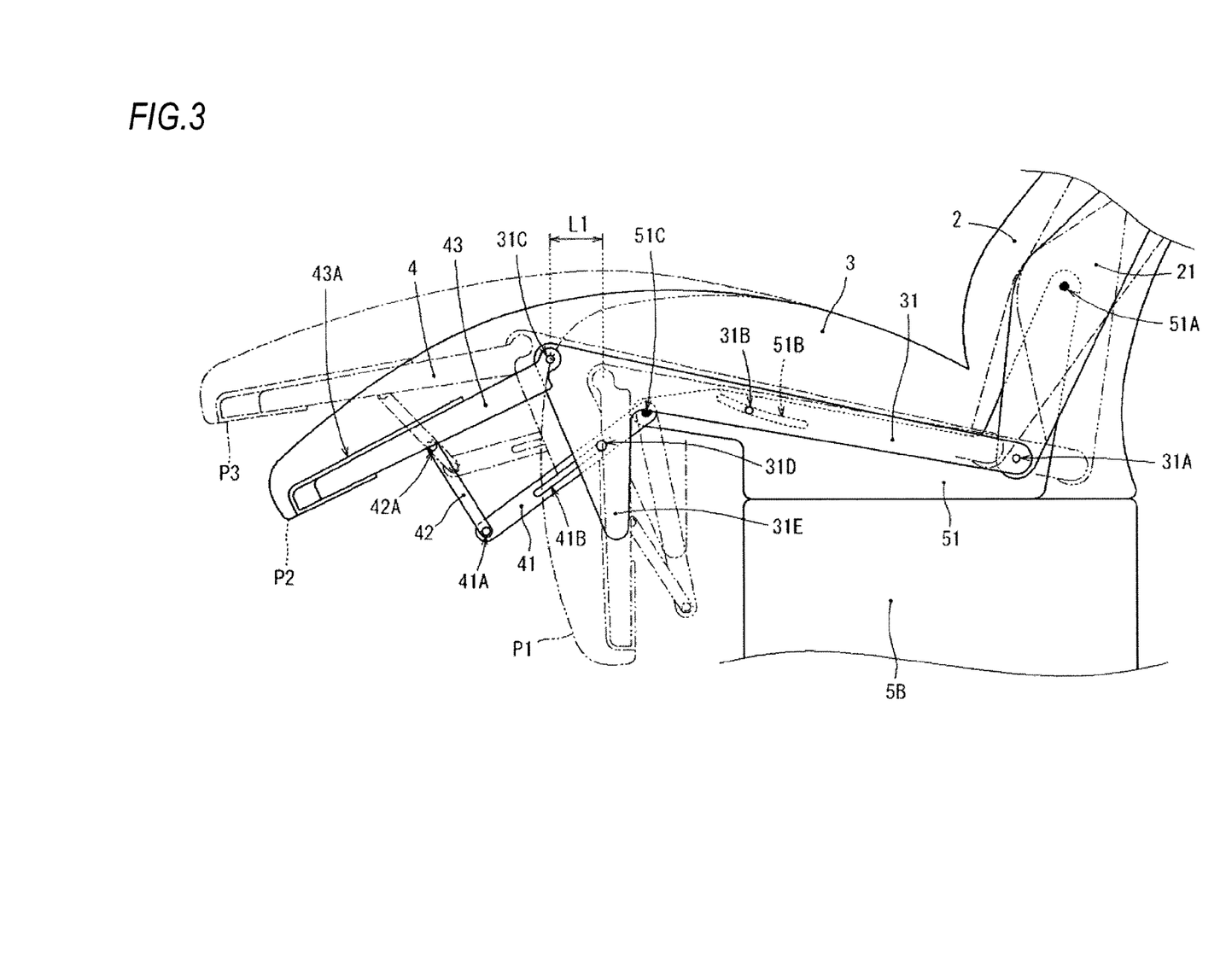
FIG. 3 is a view illustrating the transmitting mechanism in a state where the ottoman 4 is at a forward position (intermediately unfolded position) when the position of the seat cushion 3 in the front-rear direction has been moved from the normal use position to the front side (intermediate position) in the first illustrative embodiment.
Figure 4:
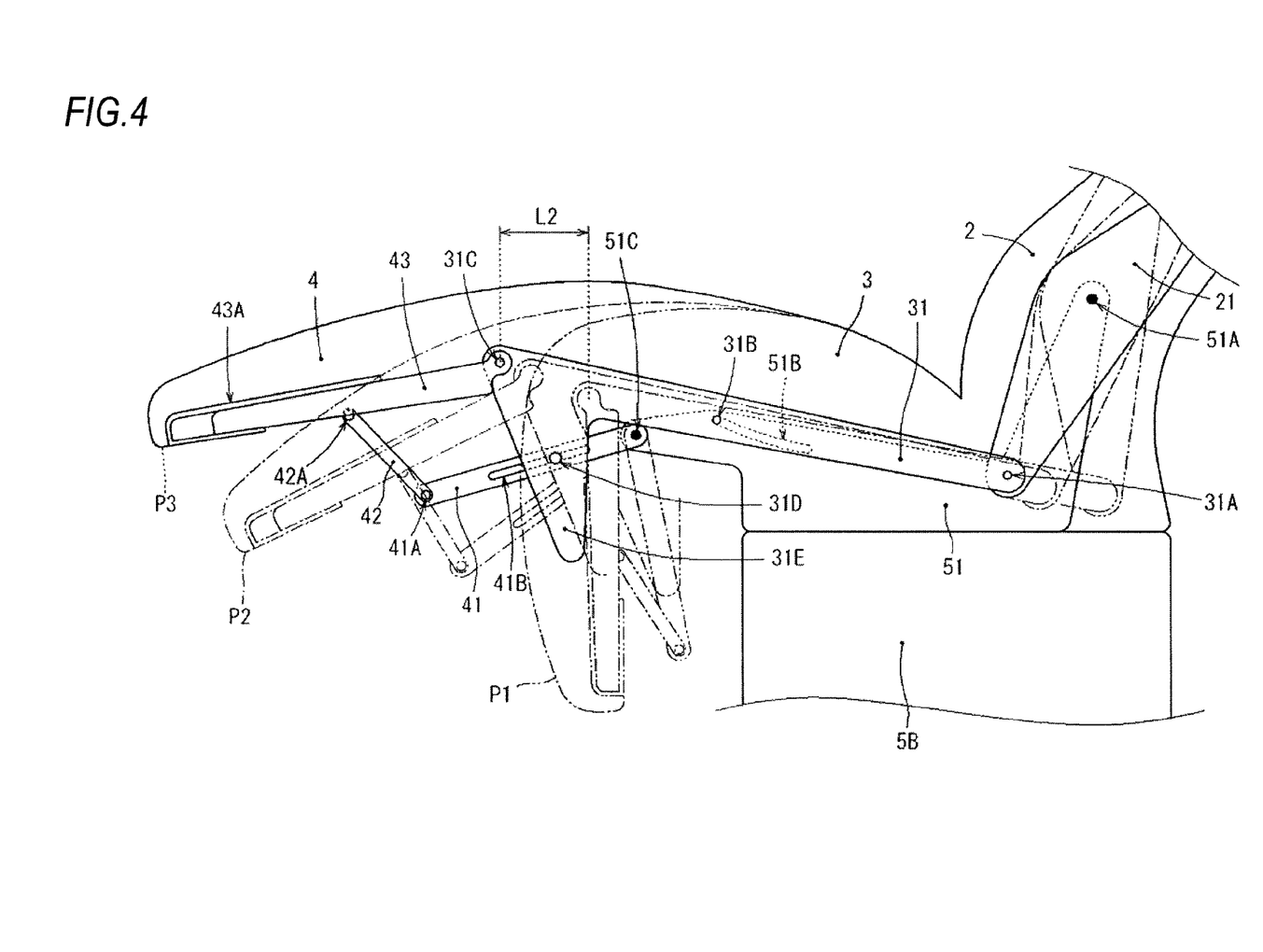
FIG. 4 is a view illustrating the transmitting mechanism in a state where the ottoman 4 is at an unfolded position (fully unfolded position) when the position of the seat cushion 3 in the front-rear direction has been moved from the normal use position to the foremost side in the first illustrative embodiment.

In the first illustrative embodiment, the position of a long hole 41B of the first link member 41 is a position where the first link member is supported by a support portion 31D provided on the slide frame 31 as shown in FIGS. 2 to 4.

Figure 5:
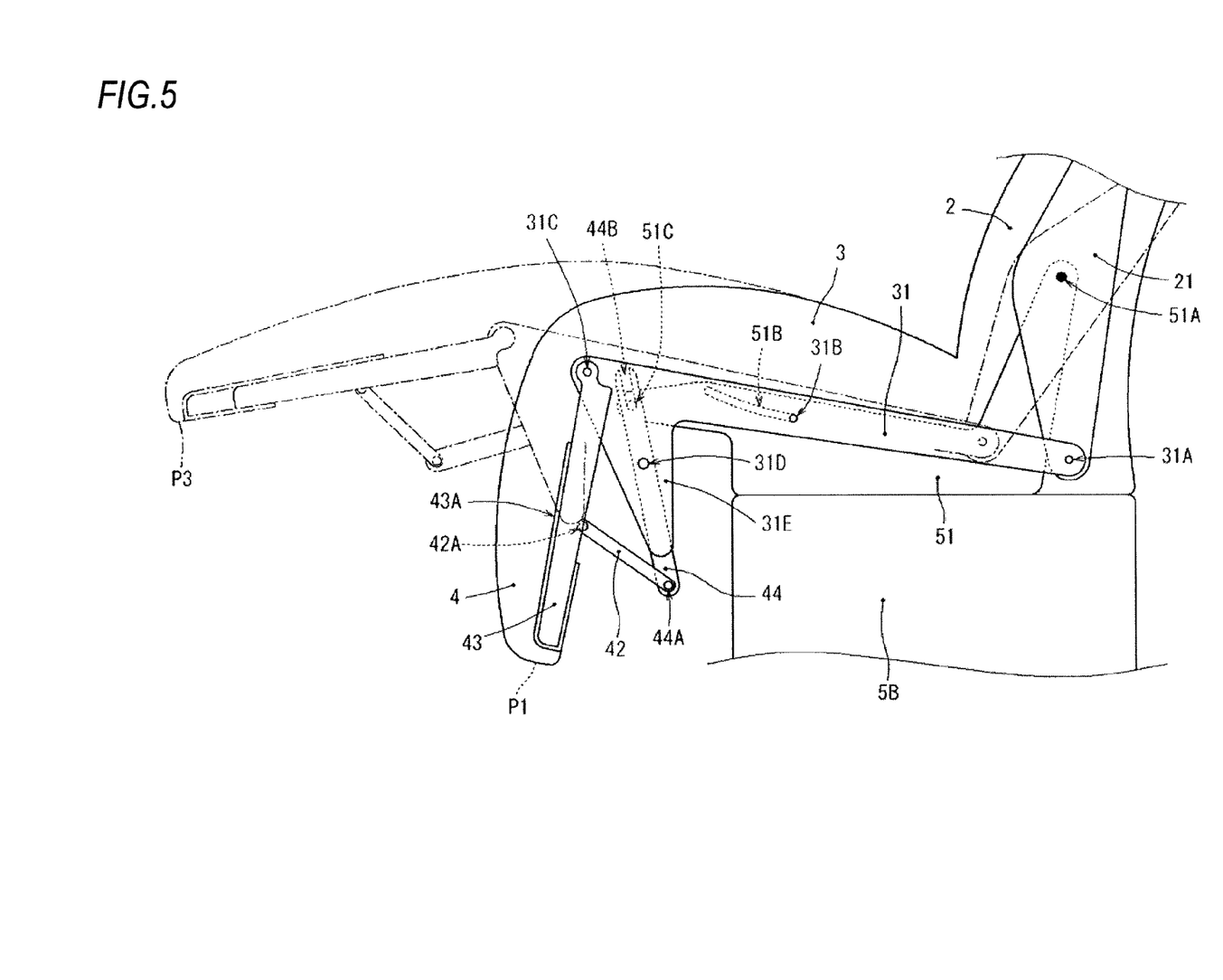
FIG. 5 is a view illustrating a transmitting mechanism in a state where the position of the seat cushion 3 in the front-rear direction is the normal use position and the ottoman 4 is at the stored position in a second illustrative embodiment.
Figure 6:
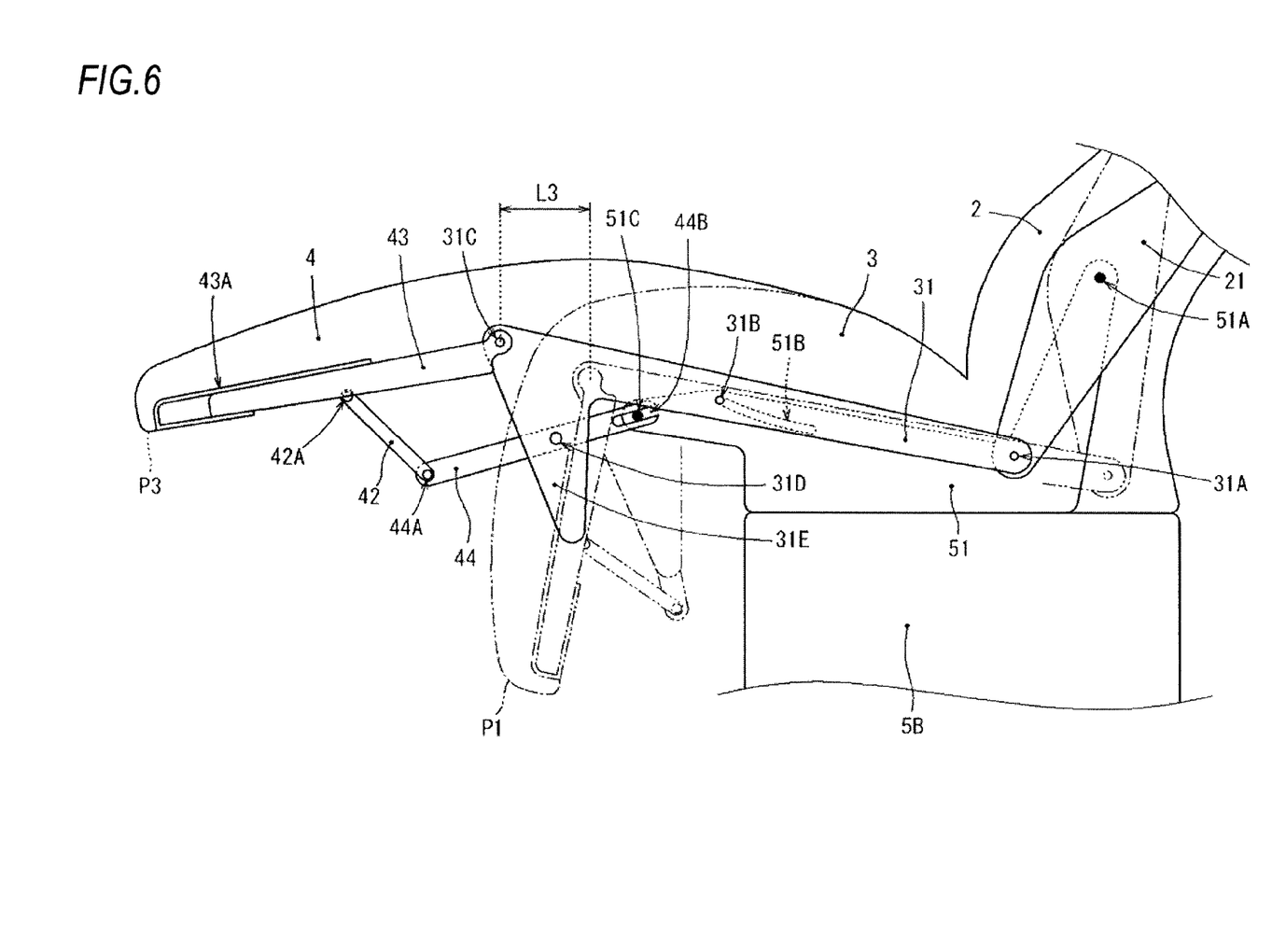
FIG. 6 is a view illustrating the transmitting mechanism in a state where the ottoman 4 is at an unfolded position (fully unfolded position) when the position of the seat cushion 3 in the front-rear direction has been moved from the normal use position to the foremost side in the second illustrative embodiment.

In contrast, in the second illustrative embodiment, the position of a long hole 44B of a first link member 44 is a position where the first link member is supported by a support portion 51C provided on a base frame 51 as shown in FIGS. 5 and 6.

FIG. 2 shows a state where the position of the seat cushion 3 in the front-rear direction is the normal use position, and the ottoman 4 is at the stored position (P1). FIG. 3 shows a state where the position of the seat cushion 3 in the front-rear direction has been moved to the front side (an intermediate position) such that the seat cushion 3 has become the comfortable position, and shows a state where the ottoman 4 is at an unfolded position (intermediately unfolded position (P2)). FIG. 4 shows a state where the position of the seat cushion 3 in the front-rear direction has been moved to the foremost position where the seat cushion is in the comfortable position, and shows a state where the ottoman 4 is at a fully unfolded position (P3).

The transmitting mechanism includes the base frame 51, the slide frame 31 (an example of a moving frame), the first link member 41, a second link member 42, and an ottoman frame 43. It is noted that the transmitting mechanism having the above-mentioned configuration is provided at right and left sides.

A base 5B is a part of the seat base 5, and is fixed portion which dose not move even if the position of the seat cushion 3 in the front-rear direction is changed. The base frame 51 is a fixed portion which is fixed to the base 5B, is provided in the front-rear direction of the seat cushion 3, and does not move even if the position of the seat cushion 3 in the front-rear direction is changed. On the base frame 51, a support portion 51A and the support portion 51C are provided. Further, in the base frame 51, a long hole 51B is formed to allow a support portion 31B provided on the slide frame 31 to be fit. The long hole 51B is formed to be inclined gradually upward toward the front side.

The seat back frame 21 which is a skeleton part of the seat back 2 is supported to be rotatable around the support portion 51A, and the lower end portion of the seat back frame 21 is supported on the slide frame 31 by a support portion 31A. When the seat cushion 3 moves forward such that the slide frame 31 moves forward, the lower end portion of the seat back frame 21 supported by the support portion 31A moves forward such that the seat back frame 21 is tilted backward.

When the position of the seat cushion 3 in the front-rear direction is changed from the normal use position to the comfortable position, the slide frame 31 slides forward with respect to the base frame 51 (the slide frame slides along the long hole 51B) in association with the amount of movement of the seat cushion 3 in the front-rear direction. The slide frame 31 gradually slides forward as the amount of forward movement of the seat cushion 3 gradually increases.

One end portion of the slide frame 31 supports the lower portion of the seat back frame 21 to be rotatable on the support portion 31A.

At an intermediate position in the longitudinal direction of the slide frame 31, the support portion 31B is provided. Further, the support portion 31B is fit into the long hole 51B formed in the base frame 51.

At the other end portion of the slide frame 31, a support portion 31C is provided, and one end portion of the ottoman frame 43 is rotatably supported by the support portion 31C. Also, on the other end portion of the slide frame 31, an extending portion 31E is formed to extend downward, and on the extending portion 31E, the support portion 31D is provided. The support portion 31D is provided slightly behind and below the support portion 31C, and the support portion 31D is fit into the long hole 41B of the first link member 41.

One end portion of the first link member 41 is supported to be rotatable around the support portion 51C provided on the base frame 51.

Also, at the other end portion of the first link member 41, a support portion 41A is provided, and one end portion of the second link member 42 is rotatably supported by the support portion 41A.

Further, at an intermediate position in the longitudinal direction in the first link member 41, the long hole 41B is formed along the longitudinal direction thereof, and the support portion 31D provided on the slide frame 31 is fit into the long hole 41B. As described above, the portion of the first link member 41 rotatably supported with respect to the slide frame 31 (the portion supported by the support portion 31D) is supported through the long hole 41B formed in the longitudinal direction of the first link member 41.

One end portion of the second link member 42 is supported to be rotatable around the support portion 41A provided at the other end portion of the first link member 41.

Also, at the other end portion of the second link member 42, a support portion 42A is provided, and an intermediate portion of the ottoman frame 43 in the longitudinal direction is rotatably supported by the support portion 42A.

The intermediate portion of the ottoman frame 43 in the longitudinal direction is supported to be rotatable around the support portion 42A provided at the other end portion of the second link member 42.

Also, one end portion of the ottoman frame 43 is supported to be rotatable around the support portion 31C provided at the other end (front end) portion of the slide frame 31.

Further, to the front end of the ottoman frame 43, a slide member 43A slidable in the front-rear direction along the longitudinal direction of the ottoman frame 43 is attached. Furthermore, the front end of the skin of the ottoman 4 and the front end of the pad of the ottoman 4 are fixed to the slide member 43A. If the ottoman 4 is moved from the stored position to the unfolded position, the pad may be compressed, resulting in wrinkling of the skin. In a case where the ottoman 4 has moved to the unfolded position, according to forward sliding of the slide member 43A, the skin and pad of the front end of the ottoman 4 slide forward. Therefore, it is possible to prevent compression of the pad and wrinkling of the skin.

According to the above-described configuration, when the position of the seat cushion 3 in the front-rear direction is set to a position corresponding to the normal use position close to the rear side, as shown in FIG. 2, the ottoman 4 are hung toward the lower side at a position where the ottoman 4 is on the rearmost side, and is stored at the stored position (P1).

When the position of the seat cushion 3 in the front-rear direction is gradually moved forward from the normal use position to the comfortable position, as shown in the example of FIG. 3, the fore end of the ottoman 4 moves upward (is unfolded) with the support portion 31C as a fulcrum while the ottoman 4 gradually moves forward (the ottoman moves forward with respect to the stored position by a distance L1 in the example of FIG. 3).

Further, when the position of the seat cushion 3 in the front-rear direction is changed to the foremost position which is the comfortable position, as shown in the example of FIG. 4, the fore end of the ottoman 4 further moves (is unfolded) upward with the support portion 31C as a fulcrum while the ottoman 4 moves to the foremost (the ottoman moves forward with respect to the stored position by a distance L2 in the example of FIG. 4), such that the ottoman is at the fully unfolded position (P3). At the fully unfolded position (P3), the ottoman 4 is unfolded nearly horizontally.

[Transmitting Mechanism of Second Illustrative Embodiment (FIGS. 5 and 6)]

The detailed structure of the transmitting mechanism of the second illustrative embodiment will be described with reference to FIGS. 5 and 6.

The position of the long hole 44B of the first link member 41 in the transmitting mechanism of the second illustrative embodiment is different from the position of the long hole 41B of the first link member 41 in the transmitting mechanism of the first illustrative embodiment.

Hereinafter, this difference will be mainly described.

The transmitting mechanism includes the base frame 51, the slide frame 31, the first link member 44, the second link member 42, and the ottoman frame 43. It is noted that the transmitting mechanism having the above-mentioned configuration is provided at right and left sides.

The configurations of the base frame 51, the slide frame 31, the second link member 42, and the ottoman frame 43 are the same as those in the first illustrative embodiment, and thus will not be described.

On one end portion of the first link member 44, the long hole 44B is formed along the longitudinal direction thereof, and the support portion 51C provided on the base frame 51 is fit into the long hole 44B.

At the other end portion of the first link member 44, a support portion 44A is provided, and one end portion of the second link member 42 is rotatably supported by the support portion 44A.

Further, an intermediate position of the first link member 41 in the longitudinal direction is supported to be rotatable around the support portion 31D provided on the slide frame 31. As described above, the one end portion of the first link member 41 rotatably supported with respect to the base frame 51 (the one end side supported by the support portion 51C) is supported through the long hole 44B formed in the longitudinal direction of the first link member 44.

According to the above-described configuration, when the position of the seat cushion 3 in the front-rear direction is set to a position corresponding to the normal use position close to the rear side, as shown in the example of FIG. 5, the ottoman 4 is hung toward the lower side at a position where the ottoman 4 is on the rearmost side, and is stored at the stored position (P1).

Further, when the position of the seat cushion 3 in the front-rear direction is changed to the foremost position where the seat cushion is in the comfortable position, as shown in the example of FIG. 6, the fore end of the ottoman 4 further moves (is unfolded) upward with the support portion 31C as a fulcrum while the ottoman 4 moves to the foremost (the ottoman moves forward with respect to the stored position by a distance L3 in the example of FIG. 6), such that the ottoman is at the fully unfolded position (P3). At the fully unfolded position (P3), the ottoman 4 is unfolded nearly horizontally.

In the transmitting mechanisms described in the first illustrative embodiment and the second illustrative embodiment, since the ottoman 4 is hung on the front end of the slide frame 31, it is possible to unfold the ottoman while moving the ottoman forward, and to appropriately prevent interference between the unfolded ottoman and the seat cushion having moved forward.

Also, in association with forward sliding of the slide frame 31, the ottoman 4 is unfolded to the more front side. Therefore, by the simpler mechanism, it is possible to unfold the ottoman 4 to a more front side without interference between the lower end of the ottoman 4 in the stored position and the floor, and to provide a more comfortable footrest to the sitting person.

Also, in the first illustrative embodiment, the long hole 41B is formed in the first link member 41, and in the second illustrative embodiment, the long hole 44B is formed in the first link member 44. The long holes 41B and 44B make it possible to expand the movable ranges of the first link members 41 and 44, and by the simpler mechanisms, it is possible to unfold the ottoman 4 nearly horizontally, and to provide a more comfortable footrest to the sitting person.

While the present invention has been shown and described with reference to certain illustrative embodiments thereof, it will be understood by those skilled in the art that various changes in form and details may be made therein without departing from the spirit and scope of the invention as defined by the appended claims.

The vehicle seat according to the present invention can be applied to seats of various conveyances such as trains, ships, and airplanes (seats for vehicle).

What is claimed is:

1. A vehicle seat comprising:
    a seat cushion movable in a front-rear direction;
    an ottoman provided at a front portion of the seat cushion such that the ottoman can be stored and unfolded to function as a footrest; and
    a transmitting mechanism which moves the ottoman from a stored position to an unfolded position in association with change of a position of the seat cushion in the front-rear direction from a rear side position which is a normal use position to a front side position which is a comfortable position, and which moves the ottoman from the unfolded position to the stored position in association with return of the position of the seat cushion in the front-rear direction from the comfortable position to the normal use position, wherein
    the transmitting mechanism includes:
        a base frame;
        a moving frame;

a first link member; and a second link member, and wherein the base frame is provided in the front-rear direction of the seat cushion, the moving frame is provided to move with respect to the base frame in association with an amount of movement of the seat cushion in the front-rear direction, and gradually move forward as an amount of forward movement of the seat cushion increases, one end portion of the first link member is rotatably supported with respect to the base frame, the other end portion of the first link member is rotatably supported with respect to one end portion of the second link member, and an arbitrary portion between the one end portion and the other end portion of the first link member is rotatably supported with respect to the moving frame, the one end portion of the second link member is rotatably supported with respect to the other end portion of the first link member, and the other end portion of the second link member is rotatably supported with respect to the ottoman, the arbitrary portion of the first link member rotatably supported with respect to the moving frame is supported through a long hole defined in a longitudinal direction of the first link member, and the ottoman is hung on a front end of the moving frame such that the ottoman is rotatable with respect to the moving frame.

2. The vehicle seat according to claim 1, wherein the moving frame is provided to slide in the front-rear direction with respect to the base frame.

3. The vehicle seat according to claim 1, further comprising:

a seat back, wherein a tilt angle of the seat back changes in association with movement of the seat cushion.

4. The vehicle seat according to claim 3, wherein the seat back includes a seat back frame which is rotatably supported with respect to a rear end portion of the moving frame.

5. A vehicle seat comprising:

a seat cushion movable in a front-rear direction;

an ottoman provided at a front portion of the seat cushion such that the ottoman can be stored and unfolded to function as a footrest; and a transmitting mechanism which moves the ottoman from a stored position to an unfolded position in association with change of a position of the seat cushion in the front-rear direction from a rear side position which is a normal use position to a front side position which is a comfortable position, and which moves the ottoman from the unfolded position to the stored position in association with return of the position of the seat cushion in the front-rear direction from the comfortable position to the normal use position, wherein the transmitting mechanism includes:

a base frame;

a moving frame;

a first link member; and a second link member, and wherein the base frame is provided in the front-rear direction of the seat cushion, the moving frame is provided to move with respect to the base frame in association with an amount of movement of the seat cushion in the front-rear direction, and gradually move forward as an amount of forward movement of the seat cushion increases, one end portion of the first link member is rotatably supported with respect to the base frame, the other end portion of the first link member is rotatably supported with respect to one end portion of the second link member, and an arbitrary portion between the one end portion and the other end portion of the first link member is rotatably supported with respect to the moving frame, the one end portion of the second link member is rotatably supported with respect to the other end portion of the first link member, and the other end portion of the second link member is rotatably supported with respect to the ottoman, the one end portion of the first link member rotatably supported with respect to the base frame is supported through a long hole defined in the longitudinal direction of the first link member, and the ottoman is hung on a front end of the moving frame such that the ottoman is rotatable with respect to the moving frame.

* * * * *